United States Patent
Hayasaka et al.

(10) Patent No.: US 9,463,743 B2
(45) Date of Patent: Oct. 11, 2016

(54) VEHICLE INFORMATION DISPLAY DEVICE AND VEHICLE INFORMATION DISPLAY METHOD

(71) Applicant: TOYOTA JIDOSHA KABUSHIKI KAISHA, Toyota-shi, Aichi-ken (JP)

(72) Inventors: Shoichi Hayasaka, Atsugi (JP); Yoshiyuki Hatakeyama, Fuji (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/571,760

(22) Filed: Dec. 16, 2014

(65) Prior Publication Data

US 2015/0183373 A1 Jul. 2, 2015

(30) Foreign Application Priority Data

Dec. 27, 2013 (JP) ................................. 2013-272625

(51) Int. Cl.
| | | |
|---|---|---|
| G09G 5/00 | (2006.01) |
| B60R 1/00 | (2006.01) |
| G06T 3/40 | (2006.01) |
| G02B 27/01 | (2006.01) |
| B60K 35/00 | (2006.01) |
| G08G 1/16 | (2006.01) |

(52) U.S. Cl.
CPC ............... *B60R 1/00* (2013.01); *B60K 35/00* (2013.01); *G02B 27/0101* (2013.01); *G06T 3/40* (2013.01); *G08G 1/163* (2013.01); *G08G 1/166* (2013.01); *B60R 2300/205* (2013.01); *B60R 2300/305* (2013.01); *B60R 2300/306* (2013.01); *B60R 2300/308* (2013.01); *G02B 2027/0181* (2013.01)

(58) Field of Classification Search
CPC ... G06T 19/006; G06T 2215/16; G06T 3/40; G06T 1/00; B60R 1/00; B60R 2300/205; B60R 2300/306; B60R 2300/305; B60R 2300/308; G02B 27/0101; G02B 2027/0181; B60K 35/00; G08G 1/163; G08G 1/166
USPC ........................................................ 345/633
See application file for complete search history.

(56) References Cited

U.S. PATENT DOCUMENTS

| 2003/0083790 | A1* | 5/2003 | Hattori | G06K 9/00651 701/1 |
| 2006/0114320 | A1* | 6/2006 | Nagaoka | G06T 7/002 348/118 |
| 2008/0309468 | A1* | 12/2008 | Greene | G08G 1/166 340/436 |

FOREIGN PATENT DOCUMENTS

| JP | 2007-249386 A | 9/2007 |
| JP | 2010-120617 A | 6/2010 |
| JP | 2011-119917 A | 6/2011 |

OTHER PUBLICATIONS

Neumann et al., "Natural Feature Tracking for Augmented Reality", IEEE Transactions on Multimedia, vol. 1, No. 1, Mar. 1999, p. 53-64.*
Calhoun et al., "Synthetic vision system for improving unmanned aerial vehicle operator situation awareness", Proceedings of SPIE vol. 5802, Dec. 2005, p. 219-230.*
Anonymous, "AutoCAD Tips", Date Published: Nov. 22, 2010, Date Retrieved, Dec. 23, 2015, URL: http://autocadtips1.com/2010/11/22/trim/, pp. 1-4.*

* cited by examiner

*Primary Examiner* — Barry Drennan
*Assistant Examiner* — Robert Craddock
(74) *Attorney, Agent, or Firm* — Sughrue Mion, PLLC

(57) ABSTRACT

A vehicle information display device including: a subject detecting sensor that detects an object in a surrounding area of a host vehicle; and a display portion that is configured to have a display area for displaying a display frame corresponded to the object in a mode of surrounding the object, and for emphatically displaying the object detected by the subject detecting sensor, and the display frame is displayed in a manner of that the emphasizing degree of an enlarging part is less than that of a non-enlarging part, when the display frame enlarges as the host vehicle moves.

5 Claims, 11 Drawing Sheets

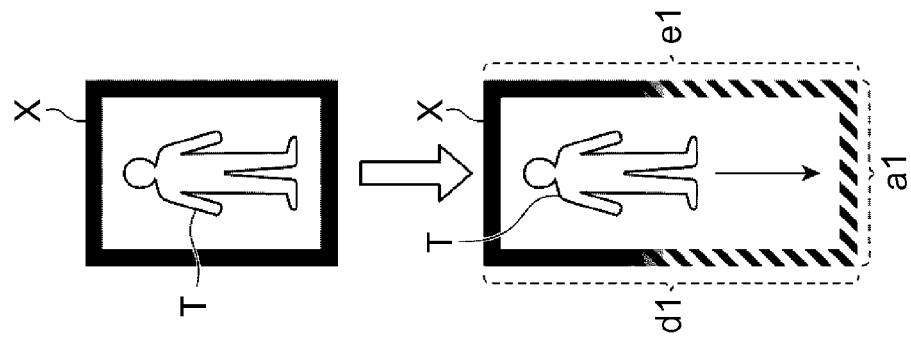
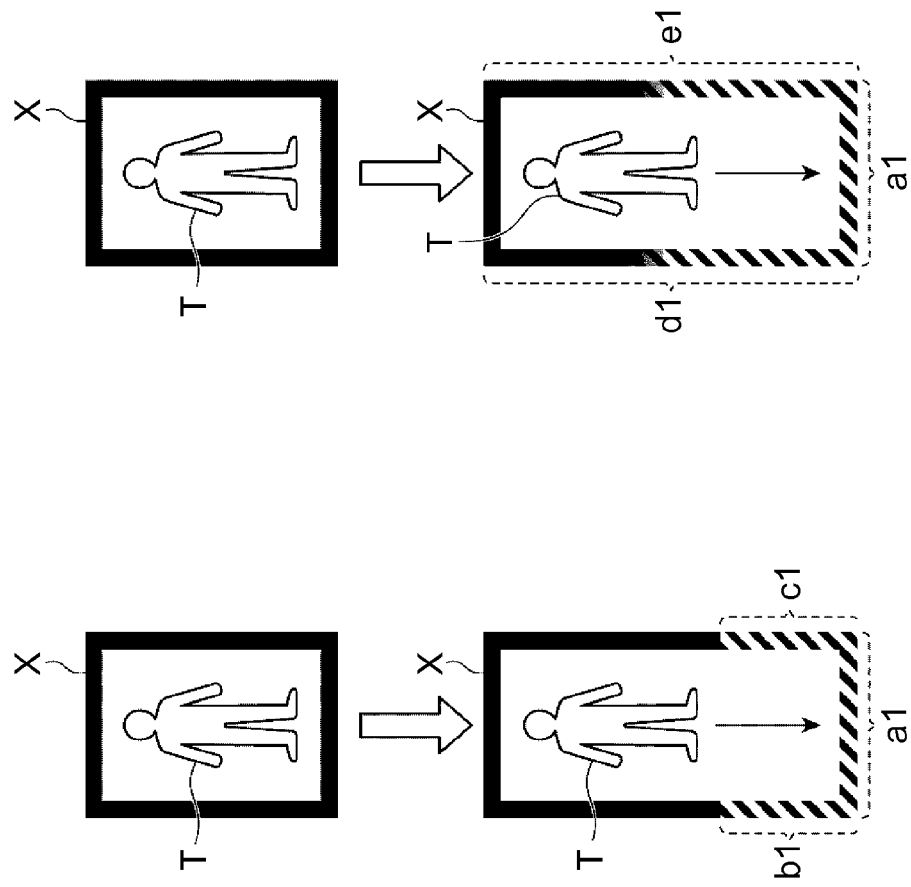
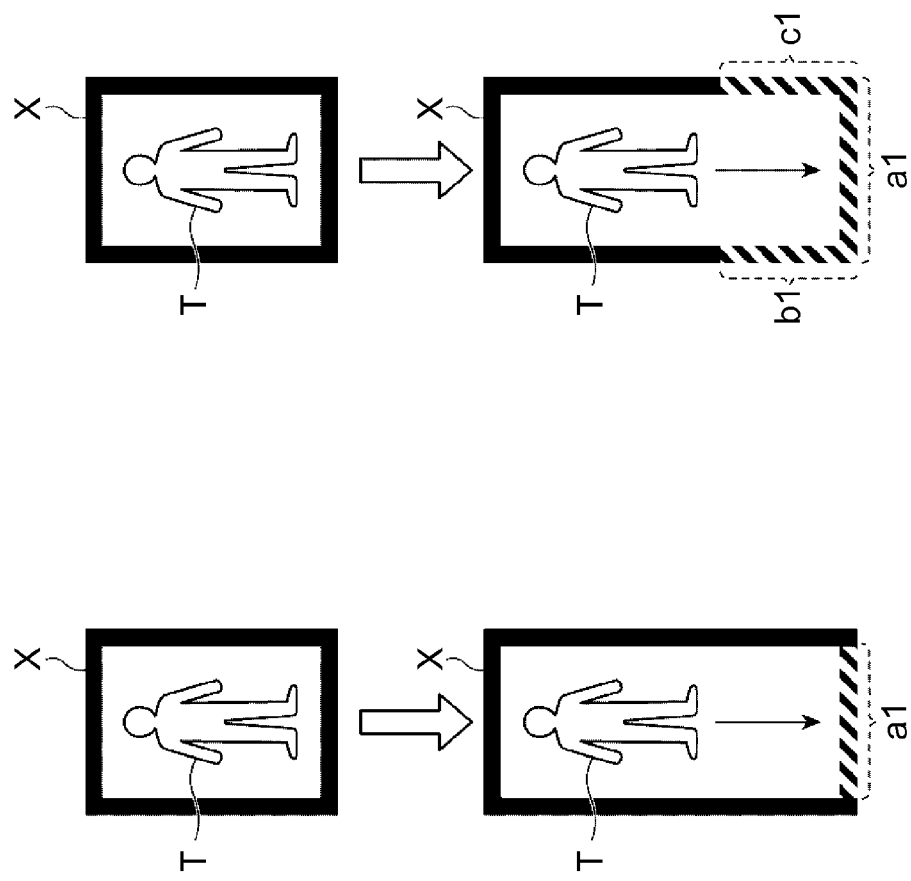

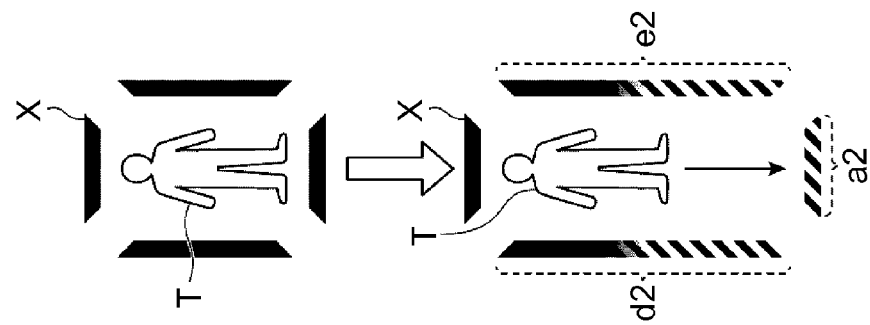
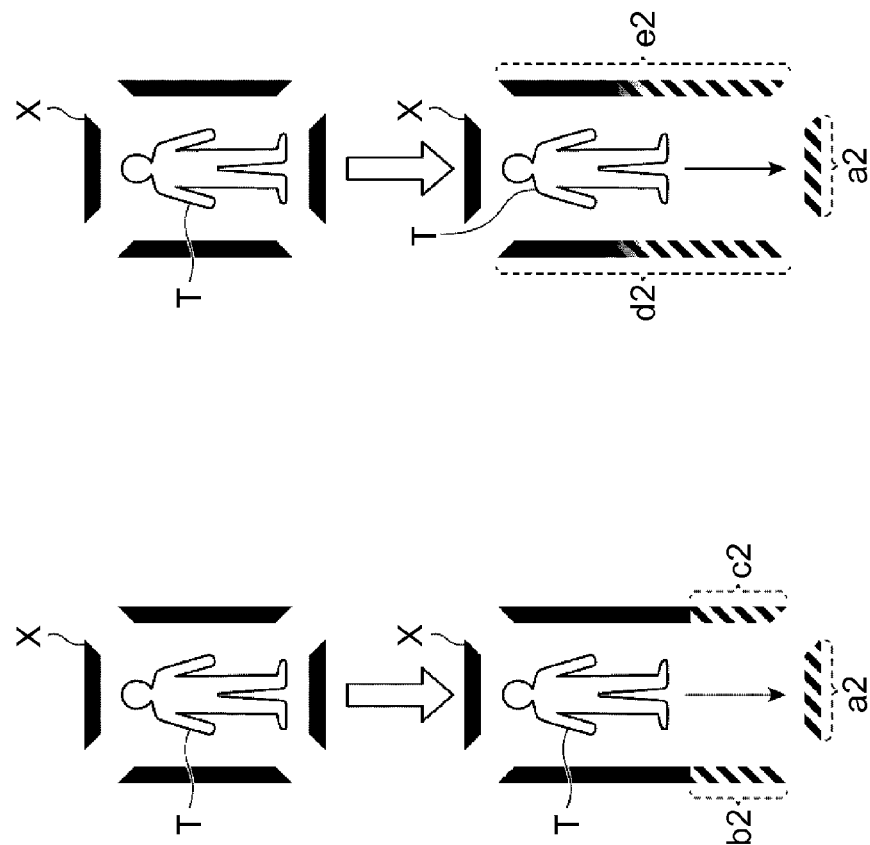
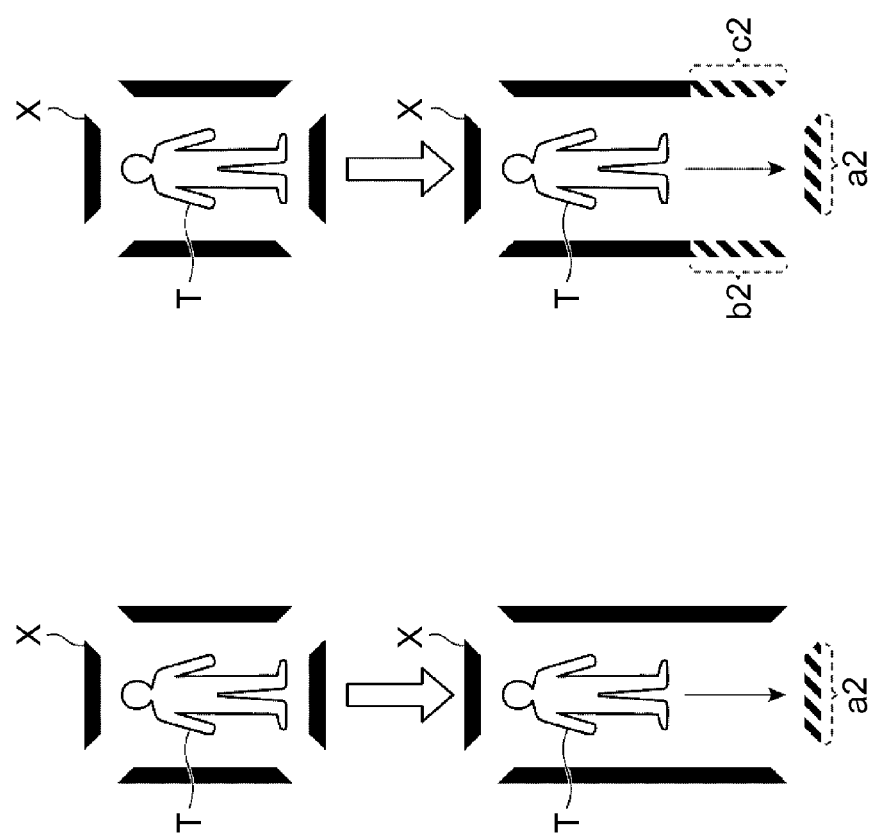

VEHICLE INFORMATION DISPLAY DEVICE AND VEHICLE INFORMATION DISPLAY METHOD

INCORPORATION BY REFERENCE

The disclosure of Japanese Patent Application No. 2013-272625 filed on Dec. 27, 2013 including the specification, drawings and abstract is incorporated herein by reference in its entirety.

BACKGROUND OF THE INVENTION

1. Field of the Invention

The present invention relates to a vehicle information display device and a vehicle information display method for displaying the information of an object in a surrounding area of a vehicle.

2. Description of Related Art

The vehicle information display device is a device that detects an object in a surrounding area of a vehicle and displays information of the object. Japanese Patent Application No. 2011-119917 A discloses the following vehicle display device: the vehicle display device determines an image including a pedestrian based on the image shot by a camera and detects the pedestrian, and displays a pedestrian detecting frame surrounding the object such as the pedestrian in the display area, so as to emphatically display the object. In the vehicle display device, the moving amount and the moving direction of the object in appearance in the display area are forecasted based on the position change of the host vehicle and the object, and the range of the pedestrian detecting frame enlarges according to the forecasted moving amount and moving direction. By enlarging the range of the pedestrian detecting frame like this, the object can be emphatically displayed without deviating from the pedestrian detecting frame.

As described above, when the object is displayed as being surrounded by a pedestrian detecting frame or the like, if the position of the object in appearance in the display area changes along with the movement of the host vehicle, the display frame enlarges from the object along with the movement of the object in appearance. If the display frame enlarges from the object, there is a possibility that the driver of the host vehicle gazes the enlarged part of the display frame, and the driver takes his eyes off the object of interest. As such, the problem is: with the movement of the object in appearance in the display area, the driver may gaze the enlarging part of the display frame in some cases, thus, the driver may feel troublesome.

SUMMARY OF THE INVENTION

The present invention provides a vehicle information display device and a vehicle information display method that are capable of lowering the troublesome the driver feels.

An aspect of the present invention relates to a vehicle information device including: an object detecting portion configured to detect an object in a surrounding area of a host vehicle; and a display portion configured to display a display frame corresponded to the object, the display frame being corresponded to the object to emphatically display the object detected by the object detecting portion, the display portion having a display area for displaying the display frame in a mode of surrounding the object. When the display frame enlarges according to a movement of the object in appearance in the display area as the host vehicle moves, the display portion displays the display frame so that an emphasizing degree of an enlarging part of the display frame is less than the emphasizing degree of a non-enlarging part.

An aspect of the present invention relates to a vehicle information display device, in which when the display frame in the display area enlarges from the object according to the movement of the object in appearance in the display area, the display frame is displayed in a manner of that the emphasizing degree of the enlarging part is less than the emphasizing degree of the non-enlarging part. Therefore, since the emphasizing degree of the enlarging part is decreased in comparison with the non-enlarging part, the driver can avoid gazing the enlarging part of the display frame. Therefore, the driver can feel less troublesome.

The display portion may also display the display frame so that the emphasizing degree when an angle is large, is less than the emphasizing degree when the angle is small, the angle being an angle between a moving direction of the object using a ground as a reference and a moving direction of the object in appearance in the display area as the host vehicle moves. Incidentally, the larger an angle between the moving direction of the object using the ground as a reference actually and the moving direction of the object in appearance as the host vehicle moves, the easier the driver can understand the difference between the enlarging part and the non-enlarging part of the display frame. Therefore, as compared with that when the angle is small, the emphasizing degree of the display frame is decreased when the angle is large, which means the driver can easily understand, so that the troublesome the driver feels can be lowered.

Also, the display portion may display the display frame so that the emphasizing degree when the angle is equal to or more than a preset threshold value, is less than the emphasizing degree when the angle is less than the threshold value. Thus, as compared with that when an angle between the moving direction of the object using the ground as a reference and the moving direction of the object in appearance is less than a preset threshold value, the emphasizing degree of the display frame is decreased when the angle of which the driver can easily understand is equal to or more than the preset threshold value, so that the troublesome the driver feels can be lowered.

Further, the display area may also be provided on a head-up display of the host vehicle. If the display area is provided on the head-up display, the information of the object is displayed substantially in the sight line of the driver. Therefore, since the driver is capable of grasping the object almost without moving his or her sight line, the timing for the driver to notice the presence of the object can be advanced.

Other aspects of the present invention relate to a vehicle information display method including: detecting an object in a surrounding area of a host vehicle; and displaying a display frame corresponded to the object using an electronic control unit, the display frame being corresponded to the object so as to emphatically display the detected object when detecting the object, wherein a display area for displaying the display frame in a mode of surrounding the object is displayed, and the display frame is displayed so that an emphasizing degree of an enlarging part of the display frame is less than the emphasizing degree of a non-enlarging part, when the display frame enlarges according to a movement of the object in appearance in the display area as the host vehicle moves.

In the vehicle information display method of other aspects of the present invention, when the display frame enlarges from the object according to the movement of the object in appearance in the display area, the display frame is displayed in a manner that the emphasizing degree of the enlarging part is less than the emphasizing degree of the non-enlarging part. Therefore, since the emphasizing degree of the enlarging part is decreased in comparison with that of the non-enlarging part, the driver can avoid gazing the enlarging part of the display frame. Therefore, the troublesome the driver feels can be lowered.

According to various aspects and embodiments of the present invention, the troublesome the driver feels can be lowered.

BRIEF DESCRIPTION OF THE DRAWINGS

Features, advantages, and technical and industrial significance of exemplary embodiments of the invention will be described below with reference to the accompanying drawing, in which like numerals denote like elements, and wherein:

FIG. 5A is a schematic diagram illustrating the enlarging part.

FIG. 5B is a schematic diagram illustrating the enlarging part.

FIG. 5C is a schematic diagram illustrating the enlarging part.

FIG. 6A is a schematic diagram illustrating the enlarging part.

FIG. 6B is a schematic diagram illustrating the enlarging part.

FIG. 6C is a schematic diagram illustrating the enlarging part.

DETAILED DESCRIPTION OF EMBODIMENTS

Figure 1:
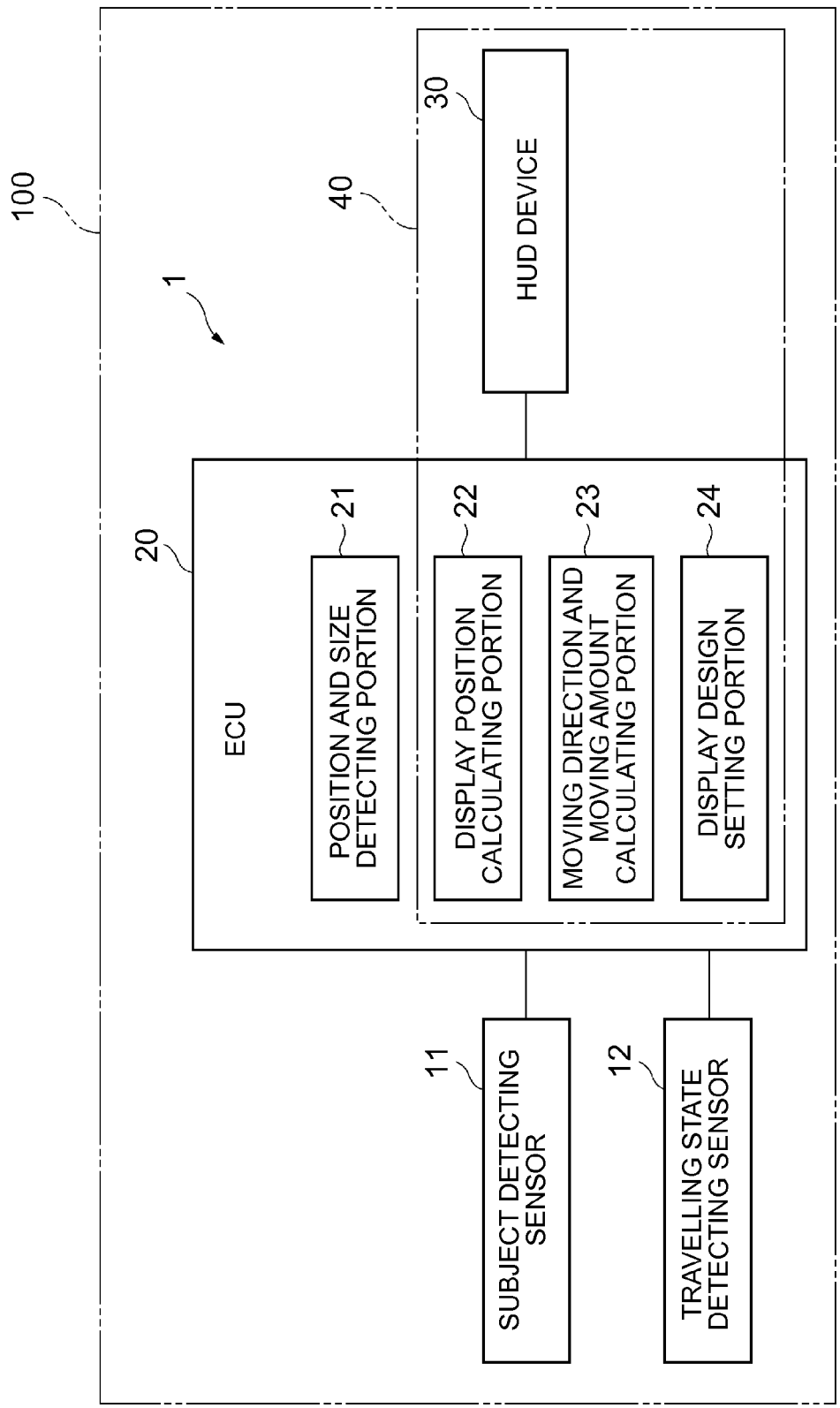
FIG. 1 is a block diagram illustrating a first embodiment of the vehicle information display device according to the present invention.

In the following description, the preferred embodiments of the present invention will be described with reference to the drawings. Also, the same or corresponding elements in the drawings are denoted by the same reference numerals, and the repeated description is omitted.

Figure 2:
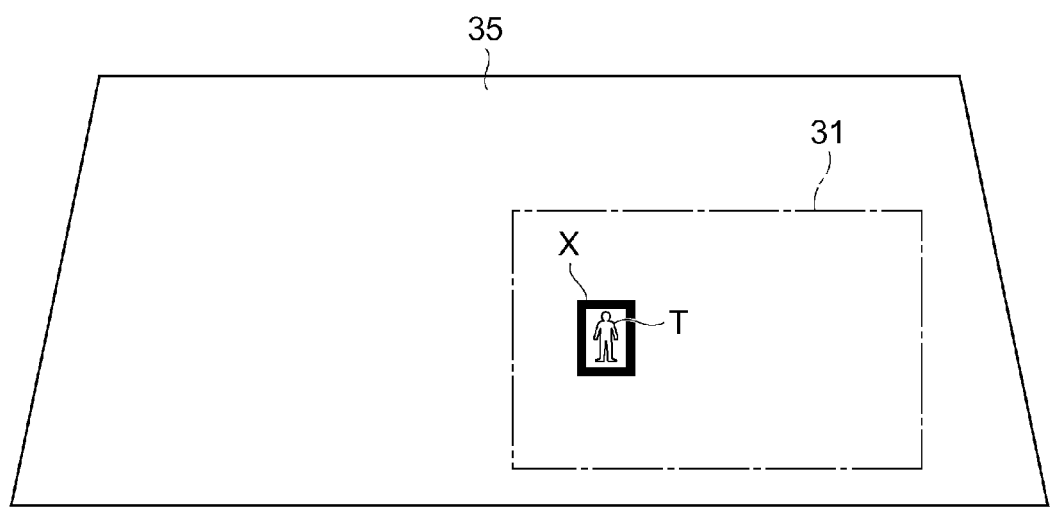
FIG. 2 is a diagram illustrating the display area of the vehicle information display device of FIG. 1.

As illustrated in FIG. 1 and FIG. 2, the vehicle information display device 1 of the first embodiment is mounted on a vehicle 100. The vehicle information display device 1 detects an object T in a surrounding area of the vehicle 100 and displays a display frame X corresponding to the object T in a display area 31 of the HUD device 30 which is used as the display system HMI (Human Machine Interface). As for the object T in the surrounding area of the vehicle 100, for example, it may be an object having risk, such as a pedestrian, a bicycle, a motorbike or another vehicle other than the vehicle 100, the object can possibly hinder the vehicle 100's traveling. In addition, various methods can be adopted to determine whether a pedestrian or the like in the surrounding area of the vehicle 100 is the object T.

The vehicle information display device 1 includes: a subject detecting sensor (object detecting portion) 11 that detects the object T in the surrounding area of the vehicle 100, namely the host vehicle; a traveling state detecting sensor 12 that detects the traveling state of the vehicle 100; and a HUD device 30 that displays the display frame X corresponded to the object T in the display area 31 for emphatically displaying the object T. Herein, the so-called display frame X is a frame-like pattern displayed in the display area 31, emphatically displaying the information of the object T in the surrounding area of the vehicle 100 in the display area 31. In addition, as illustrated in FIGS. 6A to 6C, the display frame X also includes a not completely closed frame.

In the present embodiment, the display area 31 is a head-up display provided on of the driver's seat side of a front glass 35 when looking at the front from inside of the vehicle 100, and driver of the vehicle 100 can view the display area 31 while driving. Herein, the so-called head-up display is a display that overlays information at a visual field of the driver of the vehicle 100. As the head-up display, for example, the front glass 35 or a transparent plate provided right before the front glass 35 can be used.

Also, since when the driver of the vehicle 100 looks at the object T, the object T being positioned outside the front glass 35, thus the driver can view the object T through the display area 31. And it is easier for the driver to view the display area 31 by providing the display area 31 on the driver's seat side of the front glass 35, which can improve the visibility from the driver and realize a compact display area 31.

Figure 4A:
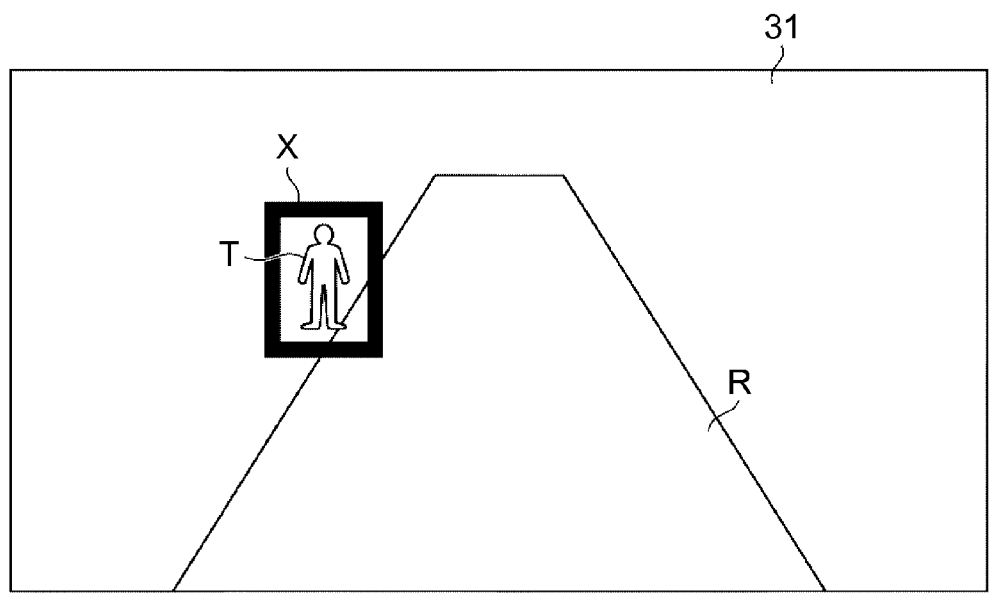
FIG. 4A is a schematic diagram illustrating the display mode of the display frame.
Figure 4B:
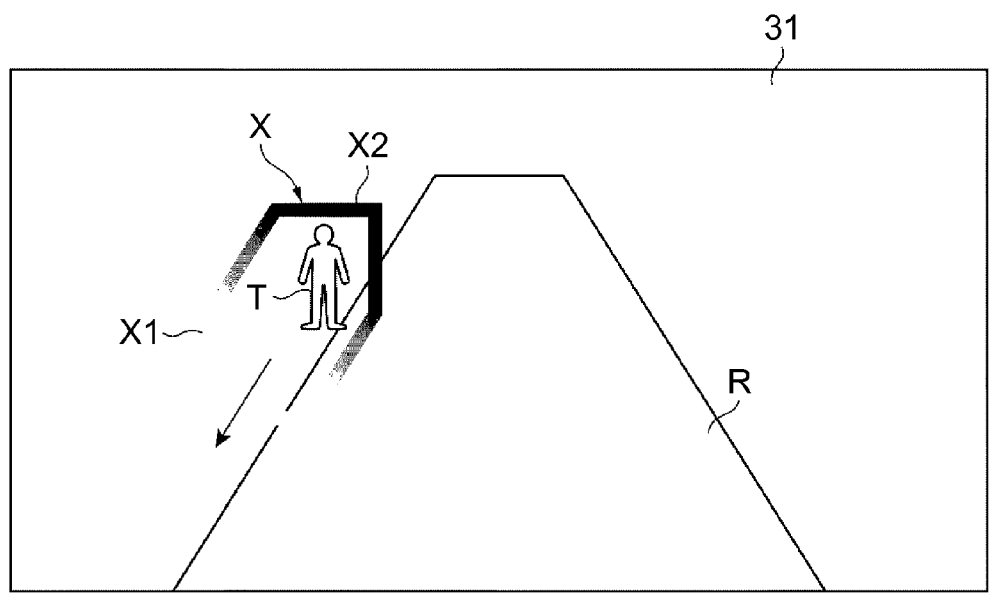
FIG. 4B is a schematic diagram illustrating the display mode of the display frame.

As illustrated in FIGS. 4A and 4B, when the object T moves in the display area 31 along with the movement of the vehicle 100, the HUD device 30 enlarges the display frame X to surround the object T which moves in the display area 31. And, when enlarging the display frame X, the HUD device 30 makes the emphasizing degree of an enlarging part X1 of the display frame X different from that of a non-enlarging part X2 of the display frame X, and displays the display frame X in the display area 31. Herein, the enlarging part X1 may be an enlarged part of the display frame X, or may also be an enlarging part of the display frame X.

The enlarging part (the enlarging part X1, X3, refer to FIG. 8A and FIG. 8B, or X5, refer to FIG. 9A and FIG. 9B) of the present embodiment is described herein. As illustrated in FIGS. 5A to 5C, for example, when the vehicle 100 is pitching upward and the object T moves downward in appearance in the display area 31, the display frame X is displayed in a mode of enlarging downward in the display area 31. At this moment, the left side part and the right side part of the display frame X extend downward and the lower side part of the display frame X moves downward.

Under this situation, as illustrated in FIG. 5A, the lower side part a1 may be the enlarging part and the emphasizing degree of the lower side part a1 may be decreased. As illustrated in FIG. 5B, the lower side part a1, the downward extending part b1 from the left side of the display frame X, and the downward extending part c1 from the right side of the display frame X may be the enlarging part and the emphasizing degree of the lower side part a1 may be decreased, and the downward extending parts b1 and c1 may be decreased. Also, as illustrated in FIG. 5C, the lower side part a1, the extended left side d1 of the display frame X, and the extended right side e1 of the display frame X may be the enlarging part, and the emphasizing degree of the lower side part a1, while the emphasizing degree of the left side d1 and the right side e1 may be decreased gradually as they extend downward.

As illustrated in FIGS. 6A to 6C, for example, when the display frame X is not completely closed, the enlarging part can be the same with that illustrated in FIGS. 5A to 5C, that is, the lower side part a2 may be the enlarging part as illustrated in FIG. 6A; or the lower side part a2, the downward extending part b2 from the left side of the display frame X, and the downward extending part c2 from the right side of the display frame X may be the enlarging part as illustrated in FIG. 6B. Also, as illustrated in FIG. 6C, the lower side part a2, the extended left side d2 of the display frame X, and the extended right side e2 of the display frame X may be the enlarging part.

Figure 7A:
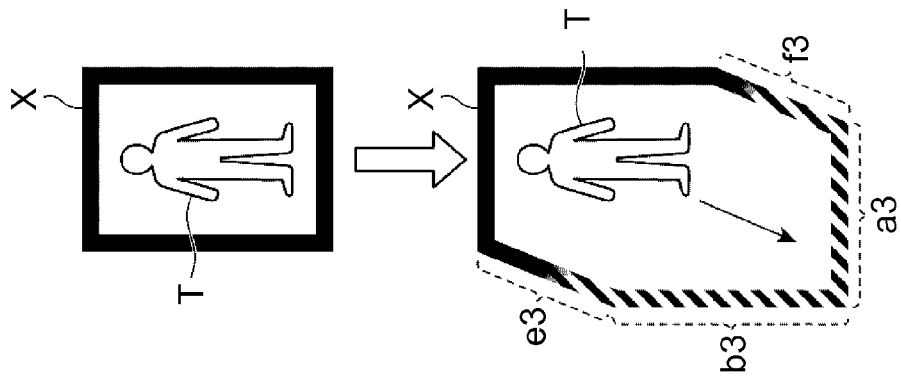
FIG. 7A is a schematic diagram illustrating the enlarging part.
Figure 7B:
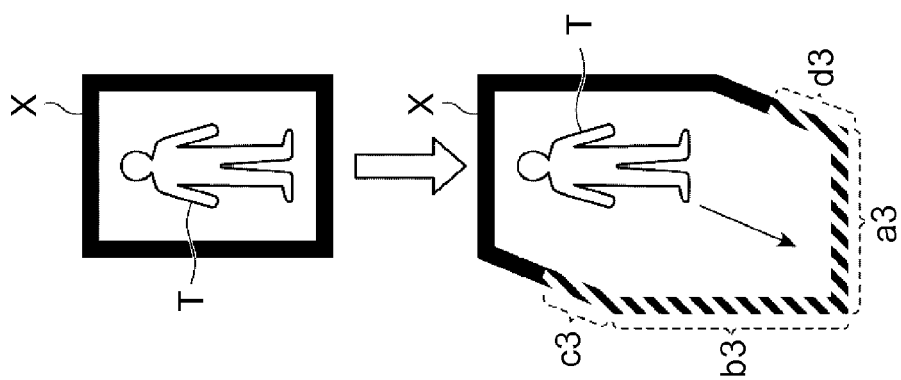
FIG. 7B is a schematic diagram illustrating the enlarging part.
Figure 7C:
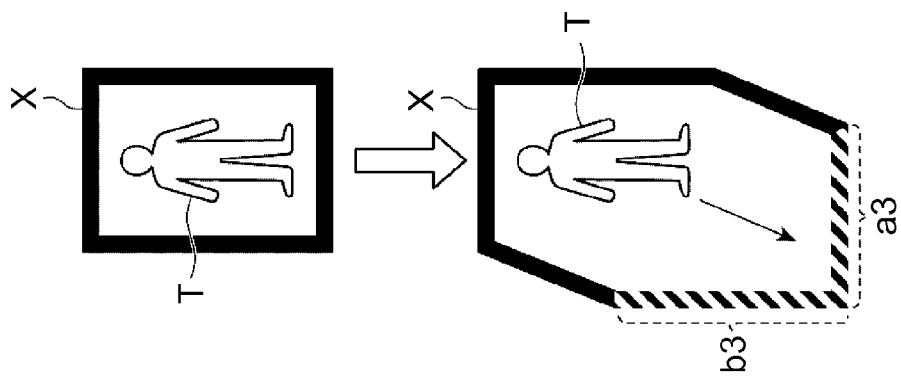
FIG. 7C is a schematic diagram illustrating the enlarging part.

Also, as illustrated in FIGS. 7A to 7C, for example, when the object T moves toward lower left in the display area 31 in appearance, the left side part b3 of the display frame X moves from the upper left corner of the display frame X toward lower left, and the lower side part a3 of the display frame X moves from the lower right corner of the display frame X toward lower left. In addition, an upper-side extending part e3 connecting the upper left corner of the display frame X and the upper end of the left side part b3, and an lower side extending part f3 connecting the lower right corner of the display frame X and the right end of the lower side part a3 are formed.

Under this situation, as illustrated in FIG. 7A, the lower side part a3 and the left side part b3 may be the enlarging part and the emphasizing degree of the lower side part a3 and the left side part b3 may be decreased. As illustrated in FIG. 7B, the lower side part a3, the left side part b3, the lower-left part c3 of the upper-side extending part e3, and the lower-left part d3 of the lower side extending part f3 may be the enlarging part, and the emphasizing degree of the lower side part a3, the left side part b3 and the lower-left parts c3 and d3 may be decreased. Also, as illustrated in FIG. 7C, the lower side part a3, the left side part b3, the upper-side extending part e3, and the lower side extending part f3 may be the enlarging part, and the emphasizing degree of the lower side part a3, the left side part b3 may be decreased, while the emphasizing degree of the upper-side extending part e3 and the lower side extending part f3 may be decreased gradually as they extend toward lower left.

Figure 8A:
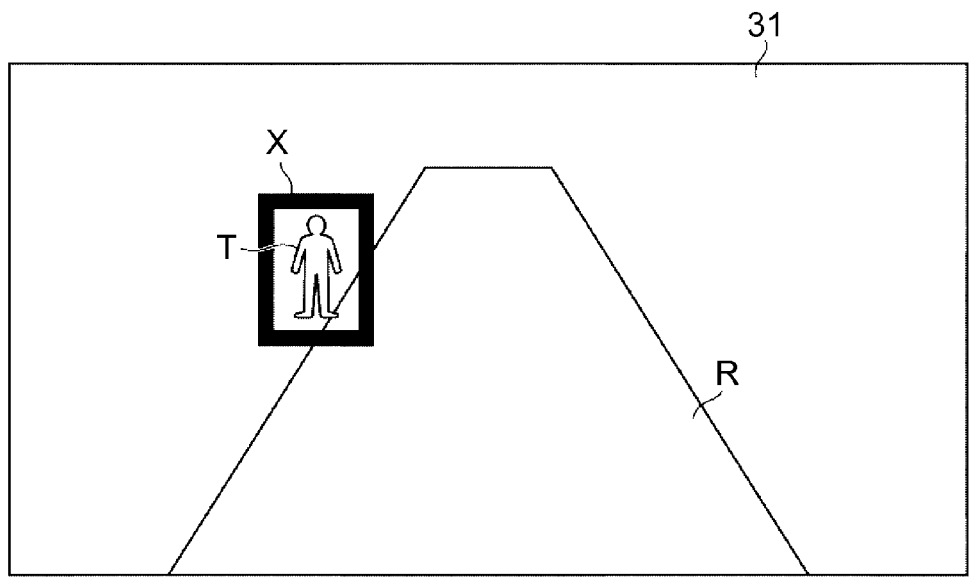
FIG. 8A is a schematic diagram illustrating the display mode of the display frame.
Figure 8B:
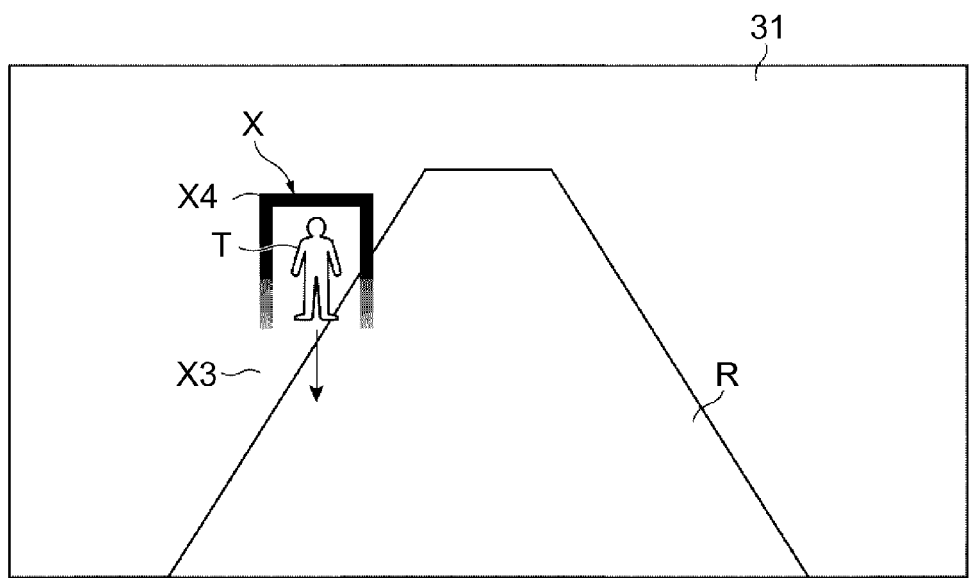
FIG. 8B is a schematic diagram illustrating the display mode of the display frame.
Figure 9A:
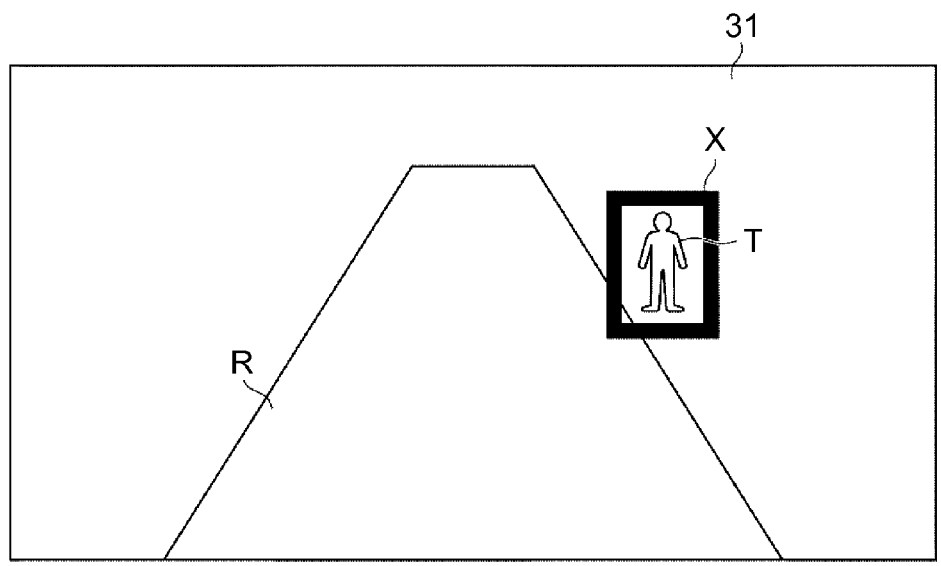
FIG. 9A is a schematic diagram illustrating the display mode of the display frame.
Figure 9B:
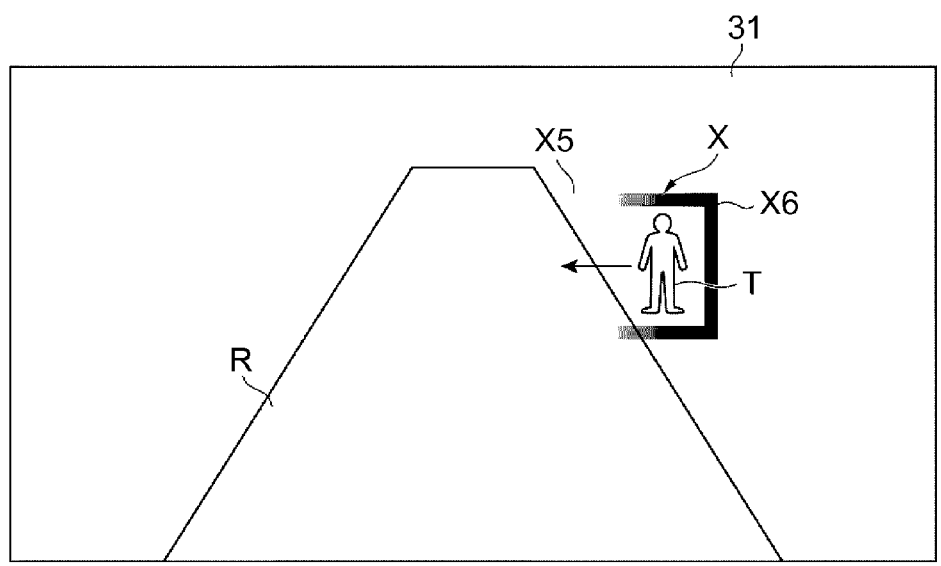
FIG. 9B is a schematic diagram illustrating the display mode of the display frame.

Further, the part equivalent to the lower side part a3 and the left side part b3 of FIGS. 7A to 7C is almost invisible in FIG. 4B, while the part equivalent to the lower side part a1 of FIG. 5C is almost invisible in FIG. 8B, and the left side part of the display frame X is almost invisible in FIG. 9B; however, these parts become invisible, resulting from the emphasizing degree is decreased and the display intensity is attenuated. Also, as the priority for decreasing the empha-sizing degree, in the examples illustrated in FIGS. 7A to 7C, the intersection point between the lower side part a3 and the left side part b3 can have the highest priority, and the priority decreases as departing from the intersection point. Also, regarding the priority for decreasing the emphasizing degree, in the examples shown in FIGS. 5A to 5C, the lower side part a1 can have the highest priority, and the priority decreases as departing from the lower side part a1.

Herein, the so-called emphasizing degree of the display frame X means the recognition easiness of the display frame X for a driver, including: color density of the display frame X, thickness of the display frame X, brightness of the display frame X, and whether the display frame X has a color that can be easily recognized, or whether the color is a preset color (e.g. red) for showing a high risk level. Further, the emphasizing degree of the display frame X does not include the size of the display frame X itself, increasing the empha-sizing degree does not include enlarging the display frame X.

Also, the so-called decreasing the emphasizing degree means making the recognition of the display frame X difficult for a driver, including: making the color density of the display frame X lighter, making the display frame X thinner, or lowering the brightness of the display frame X, for example, the color of the display frame X changing from "red" to "orange", making the display frame X difficult to be recognized, or for example, the color of the display frame X changing from "red" to "blue", changing a color showing a high risk level to a color showing a low risk level. Further, "decreasing the emphasizing degree" includes "decrease the emphasizing degree to zero", while "lower the brightness" includes "turn off the brightness". Also, "decreasing the emphasizing degree of the enlarging part" includes: decreas-ing the emphasizing degree of the enlarging part at an enlarged state; and decreasing the emphasizing degree of the enlarging part while enlarging.

As illustrated in FIG. 1, the subject detecting sensor 11 is a sensor that detects a subject in the surrounding area of the vehicle 100 as the object T, especially detects whether there is a subject that may become an obstacle. The subject detecting sensor 11, for example, outputs electromagnetic wave to the surroundings of the vehicle 100 and receives electromagnetic wave reflected from the subject in the surrounding area of the vehicle 100, thereby detecting the object T. As the subject detecting sensor 11, a millimeter wave radar, a laser radar or a camera or the like can be used. Also, the subject detecting sensor 11 may be replaced, the vehicle information display device 1 receives information from the outside, such as other vehicles or road infrastruc-ture or the like, and detects the object T based on the received information.

The subject detecting sensor 11 is connected with an ECU (Electronic Control Unit) 20 controlling the image displayed by the HUD device 30, and the ECU 20 is connected with the HUD device 30 and a traveling state detecting sensor 12. The information of the object T detected by the subject detecting sensor 11 is output to the ECU 20. Also, the traveling state detecting sensor 12 is a group of sensors including a vehicle speed sensor detecting vehicle speed of the vehicle 100, an acceleration sensor detecting the accel-eration of the vehicle 100, a turning sensor detecting the turning state of the vehicle 100, a yaw rate sensor detecting the yaw rate of the vehicle 100, a pitching sensor detecting the pitching of the vehicle 100 etc. The information such as vehicle speed, acceleration, turning state, yaw rate and pitching of the vehicle 100 detected by the traveling state detecting sensor 12 is output to the ECU 20.

The ECU 20 includes: a position and size detecting portion 21 that detects the position and the size of the object T; a display position calculating portion 22 that calculates the display position of the object T in the display area 31; a moving direction and moving amount calculating portion 23 that calculates the moving direction and the moving amount of the object T in the display area 31; and a display design setting portion 24 that sets the display design of the display frame X displayed in the display area 31.

The ECU 20 is configured to include CPU, and a memory such as ROM and RAM, and the functions of the position and size detecting portion 21, the display position calculating portion 22, the moving direction and moving amount calculating portion 23 and the display design setting portion 24 are realized by using the CPU to execute programs. Also, the functions of the position and size detecting portion 21, the display position calculating portion 22, the moving direction and moving amount calculating portion 23 and the display design setting portion 24 can be realized by using a plurality of ECUs.

The position and size detecting portion 21 detects the position and the moving information (moving direction and moving amount) of the object T detected by the subject detecting sensor 11, the moving information of the object T being related to the vehicle 100, and the position and size detecting portion 21 detects the size of the object T. The display position calculating portion 22, for example, transforms the position of the object T detected by the subject detecting sensor 11 to a coordinate of the object T when the position of the object T being projected through the front glass 35, and the display position calculating portion 22 calculates the position of the object T in the display area 31. The moving direction and moving amount calculating portion 23 uses the information relating to the traveling state of the vehicle 100 obtained from the traveling state detecting sensor 12 and the moving information of the object T, and the moving direction and moving amount calculating portion 23 calculates the moving direction and the moving amount of the object T in the display area 31. Also, the method for calculating the position of the object T and the moving direction and moving amount is not limited to the above; other method may also be used as long as the moving state of the object T on a two-dimensional plane can be acquired.

The display design setting portion 24 sets the display frame X displayed in the display area 31. If the moving direction and the moving amount of the object T in the display area 31 is calculated by the moving direction and moving amount calculating portion 23, the display design setting portion 24 sets the display frame X for surrounding the object T in the display area 31. The display design setting portion 24 sets the display frame X repeatedly when the object T is displayed in the display area 31, thus, the form of the display frame X changes properly according to the moving direction and the moving amount of the object T in the display area 31, so as to surround the object T by using the display frame X.

The form of the display frame X constantly changes according to the change of the position of the object T in the display area 31. Also, the display design setting portion 24 sets the display frame X, so that the emphasizing degree of the enlarging part X1 is less than the emphasizing degree of the non-enlarging part X2 of the display frame X. The HUD device 30 displays the display frame X in the display area 31 in a manner that the emphasizing degree of the enlarging part X1 is less than the emphasizing degree of the non-enlarging part X2. Thus, the display position calculating portion 22, the moving direction and moving amount calculating portion 23, the display design setting portion 24 and the HUD device 30 function as a display portion 40 that displays the display frame X corresponded to the object T in the display area 31. Since the object T is emphatically displayed by the display portion 40, the driver can easily recognize the object T.

Figure 3:
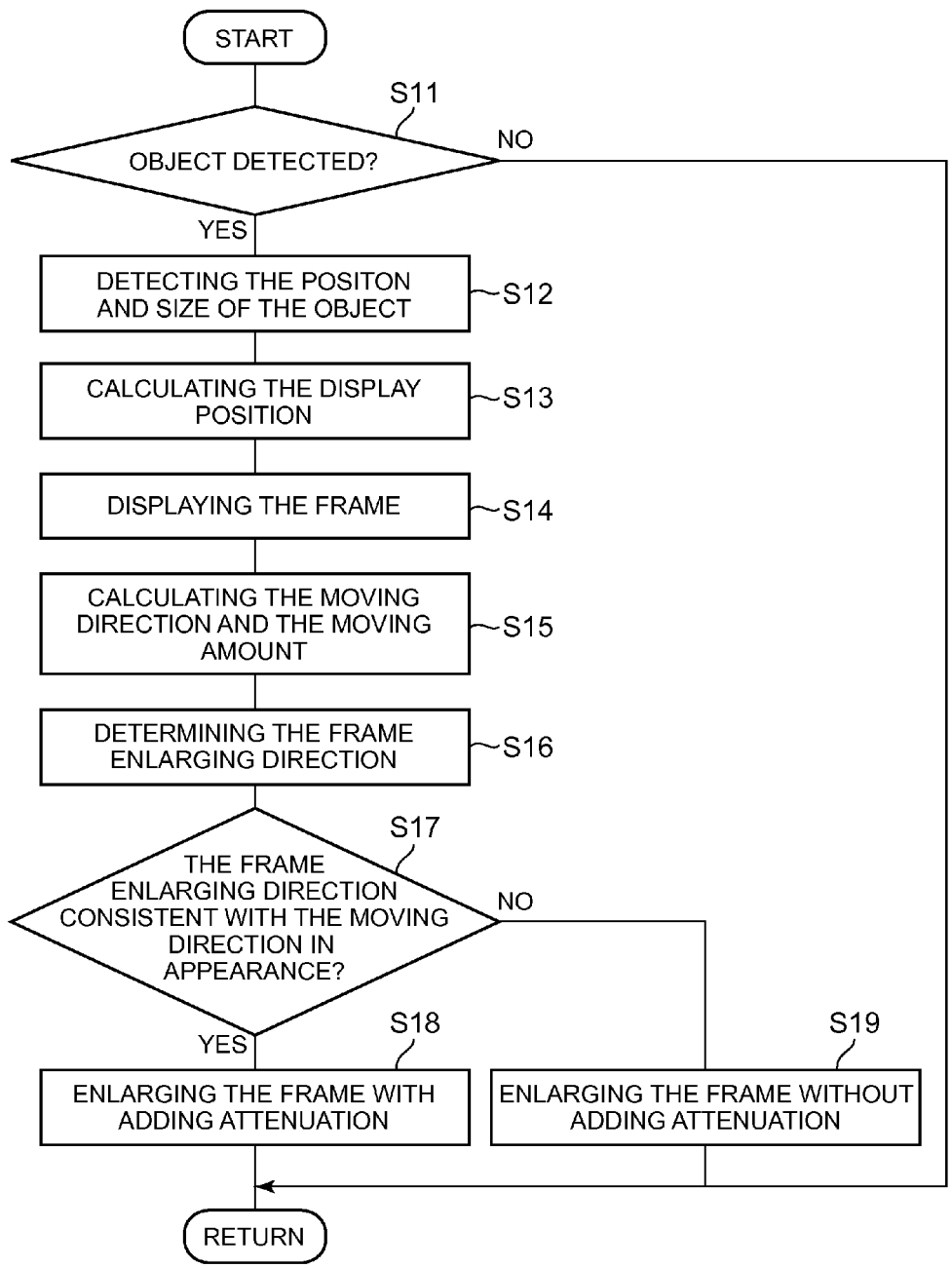
FIG. 3 is a flow chart illustrating the vehicle information display process of the first embodiment.

Next, the vehicle information display method of the present embodiment is described with reference to FIG. 3. The flow chart illustrated in FIG. 3 illustrates the procedure of the vehicle information display process by using the vehicle information display device 1. The vehicle information display process is for example, repeatedly executed at regular intervals.

First, in step S11 (hereafter referred to as "S11", the same for other steps), the object detecting process (the object detecting step) is performed by the subject detecting sensor 11. In S11, the subject detecting sensor 11 determines whether an object T exists in the surrounding area of the vehicle 100. Specifically, for example, the subject detecting sensor 11 calculates and measures the environment in the surrounding area of the vehicle 100, and determines whether an object T as an object having risk exists in the surrounding area of the vehicle 100. When it is determined in S11 that the object T does not exist in the surrounding area of the vehicle 100, a series of the process is ended. On the other hand, when it is determined in S11 that the object T exists in the surrounding area of the vehicle 100, it is proceeded to S12, and the position and size detecting portion 21 detects the position of the object T, the moving information of the object T being related to the vehicle 100, and the size of the object T.

After the position and the size of the object T are detected in S12, it is proceeded to S13, and the display position calculating process is performed by the display position calculating portion 22. Herein, the position and the size of the object T in the display area 31 are calculated based on the position and the size of the object T detected in S12. Then, it is proceeded to S14, and the frame display process is performed by the HUD device 30. In S14, the display frame X is displayed in a manner of surrounding the object T in the display area 31. Then, it is proceeded to S15, and the moving direction and moving amount calculating process is performed by the moving direction and moving amount calculating portion 23. For example, as illustrated in FIGS. 4A and 4B, when the vehicle 100 is traveling straight on a road R, the moving direction and moving amount calculating portion 23 calculates the moving direction and the moving amount of the object T itself (the moving direction and the moving amount of the object T using the ground as a reference), and the moving direction and moving amount calculating portion 23 calculates the moving direction and the moving amount of the object T in appearance caused by the straight traveling of the vehicle 100. Herein, the so-called movement in appearance of the object T means the movement of moving object T in the display area 31 as the vehicle 100 moves.

Based on the moving direction and the moving amount of the object T itself, and the moving direction and the moving amount of the object in appearance calculated in S15, in S16, the display design setting portion 25 determines the enlarging direction of the display frame X. The enlarging direction of the display frame X is determined to be a form that the object T does not exceed from the display frame X. If the enlarging direction of the display frame X is determined, it is proceeded to S17, and the display design setting portion 24 determines whether the enlarging direction of the display frame X is consistent with the moving direction of the object T in appearance. Herein, for example, when the enlarging direction of the display frame X is set as direction P1 and the moving direction of the object T in appearance is set as direction P2, and when the absolute value Z of the angle formed by the direction P1 and the direction P2 is less than a preset threshold value θz, it is determined that the enlarging direction (direction P1) of the display frame X is consistent with the moving direction (direction P2) of the object T in appearance (S17: YES). On the other hand, when the absolute value Z of the angle formed by the direction P1 and the direction P2 is equal to or more than the threshold value θz, it is determined that enlarging direction (direction P1) of the display frame X is not consistent with the moving direction (direction P2) of the object T in appearance (S17: NO). Also, the threshold value θz, for example, can be set as 30°, but it can also be changed appropriately instead.

When it is determined in S17 that the enlarging direction of the display frame X is consistent with the moving direction of the object T in appearance as described above, it is proceeded to S18, and the frame is enlarged with adding attenuation by using the HUD device 30 (display step). On the other hand, when it is determined in S17 that the enlarging direction of the display frame X is not consistent with the moving direction of the object T in appearance, it is proceeded to S19, and the frame is enlarged without adding attenuation by the HUD device 30 (display step). Herein, the so-called adding attenuation means to decrease the emphasizing degree of the enlarging part X1 of the display frame X. Thus, in S18 or S19, after the enlarging process of the frame is performed, a series of processing is ended.

However, when the vehicle 100 has a low speed, and the moving amount of the object T in appearance is small, and when the object T moves across the traveling path of the vehicle 100 and the moving amount of the object T with respect to the ground is large, that is, when the moving amount of the object T with respect to the ground is equal to or more than the moving amount of the object T moving across the traveling path in appearance by an a preset threshold value, the movement of the object T with respect to the ground is dominant in comparison with the movement of the object T in appearance. The result is, the display frame X is enlarging in the moving direction of the object T with respect to the ground, however, in this case, the direction that the driver should gaze is consistent with the enlarging direction of the display frame X, and the moving direction of the object T in appearance is not consistent with the enlarging direction of the display frame X, it is not necessary to suppress the emphasizing degree of the display frame X. Therefore, as shown in the above-described S19, the frame is enlarged without adding attenuation, so that unnecessary suppression of the emphasizing degree can be prevented.

As described above, in the vehicle information display device 1 and the vehicle information display method of the present embodiment, when the display frame X in the display area 31 enlarges as the vehicle 100 moves, the emphasizing degree of the enlarging part X1 is less than the emphasizing degree of the non-enlarging part X2. Therefore, since the emphasizing degree of the enlarging part X1 is decreased in comparison with that of the non-enlarging part X2, the driver can be prevented from gazing the enlarging part X1 of the display frame X. Hence, the troublesome the driver feels can be lowered.

Examples illustrated in FIGS. 4A and 4B are illustrated in detail. If a pedestrian, namely an object T is detected on the left side of the road R when the vehicle 100 is traveling forward on the road R, the object T moves toward lower left in appearance in the display area 31 when the vehicle 100 is traveling forward. With the movement of the object T in appearance, the display frame X is displayed in the display area 31 in a manner of enlarging toward lower left. At this time, by using the HUD device 30, the enlarging part X1 that enlarges toward lower left is displayed with a less emphasizing degree in comparison with that of the non-enlarging part X2. Also, the display frame X is displayed in a manner of that the emphasizing degree decreases as departing from the object T, thus, the driver tends not to take his or her eyes off the object T.

Further, as illustrated in FIGS. 8A and 8B, when the vehicle 100 is pitching upward and the object T moves downward in the display area 31 in appearance, the display frame X is displayed in a mode of enlarging downward in the display area 31. At this time, by using the HUD device 30, the enlarging part X3 that enlarges downward is displayed with a less emphasizing degree in comparison with that of the non-enlarging part X4.

Further, as illustrated in FIGS. 9A and 9B, if a pedestrian (object T) is detected on the right side of the road R when the vehicle 100 is about to turn right on the road R, the object T moves toward the left side in appearance when the vehicle 100 turns right. Thus, the display frame X is displayed in the display area 31 in a mode of enlarging toward the left side. At this time, by using the HUD device 30, the enlarging part X5 that enlarges toward the left side is displayed with a less emphasizing degree in comparison with that of the non-enlarging part X6.

As described above, since the enlarging part X1, X3 or X5 is displayed with a less emphasizing degree in comparison with that of the non-enlarging part X2, X4, X6 by the HUD device 30, the driver of the vehicle 100 tends not to gaze the enlarging part X1, X3, X5. Therefore, the driver can avoid taking his eyes off the object T, and the troublesome the driver feels can be lowered.

Further, since the display area 31 is provided on the head-up display of the vehicle 100, the information of the object T is displayed substantially in the sight line of the driver. Therefore, since the driver is capable of grasping the object T without nearly moving the sight line, the timing for the driver to notice the presence of the object T can be advanced. Further, the driver can quickly take response actions (e.g. decelerating, steering) with respect to the object T.

Further, the vehicle information display device and the vehicle information display method of the second embodiment are described with reference to FIGS. 10A, 10B and 11. The vehicle information display device of the second embodiment has the same configuration as the vehicle information display device of the first embodiment, only the process content of the vehicle information display method is different from that of the first embodiment. Therefore, the following description will focus on the part different from the first embodiment, while the description of the part that is same with the first embodiment is omitted.

Figure 10A:
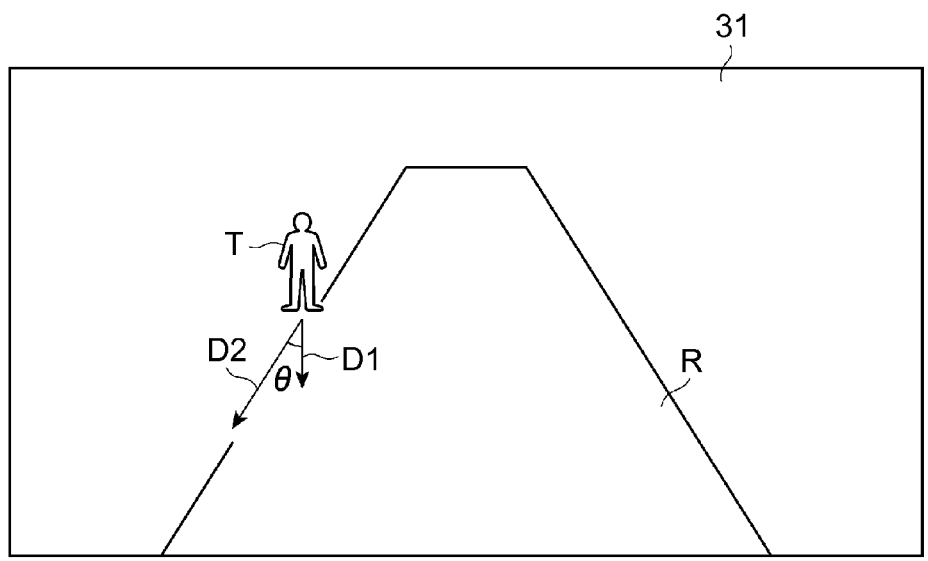
FIG. 10A is a diagram illustrating the moving direction of the object and the moving direction in appearance.
Figure 10B:
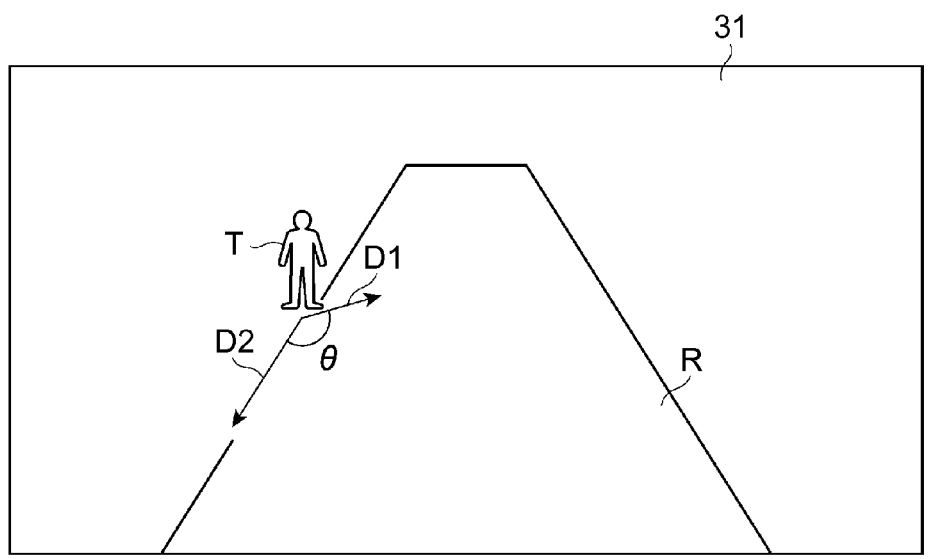
FIG. 10B is a diagram illustrating the moving direction of the object and the moving direction in appearance.

As illustrated in FIGS. 10A and 10B, the HUD device 30 changes the emphasizing degree of the display frame X, according to the angle θ between the moving direction D1 of the object T using the ground as a reference and the moving direction D2 of the object T in the display area 31 in appearance as the vehicle 100 moves. The larger the angle θ formed by the direction D1 and D2 is, the easier it is for the driver to take his or her eyes off the object T. But in the present embodiment, the larger the angle θ is, the less the emphasizing degree of the enlarging part X1 is. That is to say, since the angle θ of the example illustrated in FIG. 10 B is larger than that of the example illustrated in FIG. 10 A, the emphasizing degree of the enlarging part X1 is decreased. Thus, the driver tends not to take his or her eyes off the object T. On the other hand, the emphasizing degree of the enlarging part X1 when the angle θ is small, is larger than the emphasizing degree of the enlarging part X1 when the angle θ is large.

Herein, the moving direction D1 of the object T using the ground as a reference can be, for example, calculated from the difference value between the direction D2 of the object T in appearance and the traveling direction of the vehicle 100. Further, when the subject detecting sensor 11 is a camera, the direction D1 can also be, for example, calculated by determining the orientation of a pedestrian's face or the direction of front end of a bicycle or a vehicle, based on the analysis result of the shot images and the pattern matching result. Also, the direction D1 can be calculated by using various methods other than the above-described methods.

Figure 11:
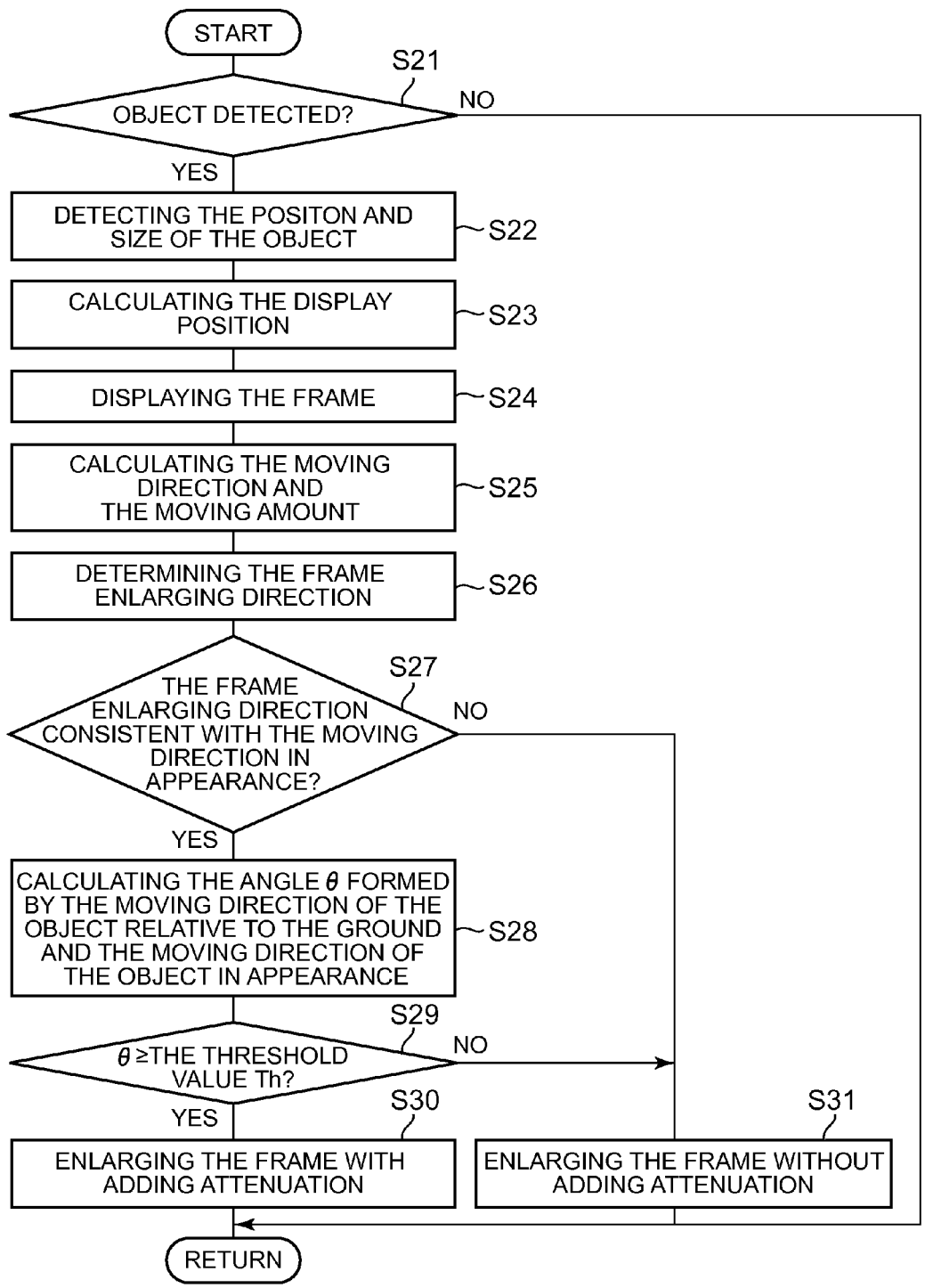
FIG. 11 is a flow chart illustrating the vehicle information display process of the second embodiment.

The vehicle information display method of the second embodiment is, for example, performed according to the flow chart illustrated in FIG. 11. The vehicle information display process of the flow chart is, for example, repeatedly executed at regular intervals.

The process of S21 to S27 is the same as the process of S11 to S17 illustrated in FIG. 3, thus, the detailed description is omitted. Further, the same as that in S17, in S27, for example, the enlarging direction of the display frame X is set as the direction P1, and the moving direction of the object T in appearance is set as the direction P2, when the absolute value Z of the angle formed by the direction P1 and the direction P2 is less than a preset threshold value θz, it is determined that the enlarging direction (direction P1) of the display frame X is consistent with the moving direction (direction P2) of the object T in appearance (S27: YES). On the other hand, when the absolute value Z of the angle formed by the direction P1 and the direction P2 is equal to or more than the preset threshold value θz, it is determined that the enlarging direction (direction P1) of the display frame X is not consistent with the moving direction (direction P2) of the object T in appearance (S27: NO).

In S28, the angle (angle θ) is calculated by the moving direction and moving amount calculating portion 28, the angle (angle θ) being formed by the moving direction of the object T with respect to the ground (the moving direction relative to the ground), namely the direction D1, and the moving direction of the object T in appearance, namely the direction D2. Then, it is proceeded to S29, the moving direction and moving amount calculating portion 23 determines whether the angle θ is equal to or more than a preset threshold value Th. Herein, the so-called preset threshold value Th is the value that is used as a reference for determining whether the frame is enlarged with adding attenuation or enlarged without adding attenuation. The threshold value Th may be, for example, a pre-determined fixed value, or a variable value that changes according to a preset rule. When it is determined that the angle θ is equal to or more than the threshold value Th, it is proceeded to S30; and when it is determined that the angle θ is less than the threshold value Th, it is proceeded to S31. In S30, the frame is enlarged with adding attenuation at the HUD device 30. On the other hand, in S31, the frame is enlarged without adding attenuation at the HUD device 30. Thus, after the enlarging process of the frame is performed in S30 or S31, a series of process is ended. Further, the value of the above-mentioned threshold value Th can be changed appropriately.

As described above, in the vehicle information display device and the vehicle information display method of the second embodiment, the display frame X is displayed in a manner that the emphasizing degree when the angle θ is large, is less than the emphasizing degree when the angle θ is small, the angle θ being an angle between the moving direction D1 of the object T using the ground as a reference and the moving direction D2 of the object T in appearance as the vehicle 100 moves. The so-called when the angle θ is large means that the angle θ is equal to or more than the threshold value Th, and the so-called when the angle θ is small means that the angle θ is less than the threshold value Th. Thus, the emphasizing degree when the angle θ is equal to or more than the threshold value Th, is less than the emphasizing degree when the angle θ is less than the threshold value Th, so that the driver of the vehicle 100 can easily understand the difference between the enlarging part X1 and the non-enlarging part X2 of the display frame X. Therefore, the driver can avoid reliably taking his or her eyes off the object T, and the troublesome the driver feels can be lowered.

Further, in the second embodiment, when the angle θ is equal to or more than the threshold value Th, the emphasizing degree of the enlarging part X1 is less than the emphasizing degree of the non-enlarging part X2. However, the threshold Th may not be used; for example, the emphasizing degree of the enlarging part X1 may also be decreased gradually with the increase of the angle θ.

Further, the vehicle information display device and the vehicle information display method of the present invention are not limited to the description of the above embodiments. As for the vehicle information display device and the vehicle information display method of the present invention, the vehicle information display device and the vehicle information display method may be modified without departing from the gist of each claim, or may be applied to other embodiments.

In the above described embodiments, the display frame X is displayed in the display area 31 in a mode that the color density of the enlarging part X1 is lighter than the color density of the non-enlarging part X2, but the display mode of the display frame X is not limited to the above described embodiments. For example, it may be displayed as such that the enlarging part is thinner than the non-enlarging part, or the brightness of the enlarging part is lower than the brightness of the non-enlarging part, or the color of the display frame X may be set as a color that is difficult to be recognized, or the color of the display frame may be changed to a color showing a lower risk level (e.g. blue).

Further, in the above described embodiments, examples in which the HUD device 30 makes the emphasizing degree of the enlarging part X1 less than the emphasizing degree of the non-enlarging part X2 are described, however, as methods for determining whether the display frame is enlarged, various methods can be adopted. For example, it may be determined that the display frame is enlarged when the enlarging amount of the display frame in the display area exceeds a reference value. Under this situation, the reference value can be set as an appropriate value. Further, it can also change the adjustment value emphasizing degree with establishing a correspondence to the increasing/decreasing of the enlarging amount of the display frame.

Further, in the above described embodiments, the example is described in which the HUD device 30 makes the emphasizing degree of the enlarging part X1 relatively less than the emphasizing degree of the non-enlarging part X2 by decreasing the emphasizing degree of the enlarging part X1 with adding attenuation. However, it is not limited to this example; the emphasizing degree of the enlarging part X1 can also be relatively less than the emphasizing degree of the non-enlarging part X2 with adding attenuation, by increasing the emphasizing degree of the non-enlarging part X2 attenuation.

Further, in the above described embodiments, as illustrated in the flow chart in FIG. 3, when the enlarging direction of the frame is consistent with the moving direction of the object T in appearance, the frame is enlarged with adding attenuation. However, it is not limited to the example; for example the process shown in S17 to S19 can be replaced, and only the process that makes the emphasizing degree of the enlarging part X1 less than the emphasizing degree of the non-enlarging part X2 can be performed.

Further, in the above described embodiments, the moving direction and moving amount calculating portion 23 uses the information about the traveling state of the vehicle 100 obtained from the traveling state detecting sensor 12 to calculate the moving state, but it may also use the information relating to whether the road in the surrounding area of the vehicle 100 includes a curve, and information relating to the unevenness of the road or other environmental information, so as to calculate the moving state.

Further, in the above described embodiments, the display area 31 is provided on the head-up display of the vehicle 100, but as the display area, other display area other than the head-up display can also be used. That is to say, the display area 31 can be replaced, and, for example a meter panel, a vehicle navigation image or other display area may be used. Further, in the above described embodiments, the HUD device 30 is provided on the vehicle 100, but the HUD device 30 may be replaced and an equipment that can be brought into the vehicle 100 as a display may be used. Specifically, a communication terminal (e.g. smart phone, tablet terminal) with display image that is brought into the vehicle can be used as the display portion. Under this situation, a display area can be set on a meter panel image, a vehicle navigation image or display image of the communication terminal or the like.

As described above, even when the display image of a meter panel, the vehicle navigation image or the display image of the communication terminal is used as the display area, the driver can avoid gazing the enlarging part by changing the emphasizing degree of the enlarging part of the display frame and the emphasizing degree of the non-enlarging part, thus same effect of the above described embodiments is achieved.

In addition, the above described the first embodiment and the second embodiment can also be appropriately combined. Under this situation, when the angle θ illustrated in FIGS. 10A and 10B is large, the difference of the emphasizing degree further increases when the display frame is enlarging (the emphasizing degree of the enlarging part X1 is further decreased); on the other hand, when the angle θ is small, the expansion of the difference of the emphasizing degree is suppressed in comparison with that when the angle θ is large.

What is claimed is:

1. A vehicle information display device comprising:
an object detecting portion configured to detect an object in a surrounding area of a host vehicle; and
a display portion configured to display a display frame corresponded to the object,
the display frame being corresponded to the object to emphatically display the object detected by the object detecting portion, the display portion having a display area for displaying the display frame in a mode of surrounding the object,
when the display frame enlarges according to a movement of the object in appearance in the display area as the host vehicle moves, the display portion displaying the display frame so that an emphasizing degree of an enlarging part of the display frame is less than the emphasizing degree of a non-enlarging part.

2. The vehicle information display device according to claim 1, wherein,
the display portion displays the display frame so that the emphasizing degree when an angle is large, is less than the emphasizing degree when the angle is small, the angle being an angle between a moving direction of the object using a ground as a reference and a moving direction of the object in appearance in the display area as the host vehicle moves.

3. The vehicle information display device according to claim 2, wherein,
the display portion displays the display frame so that the emphasizing degree when the angle is equal to or more than a preset threshold value, is less than the emphasizing degree when the angle is less than the threshold value.

4. The vehicle information display device according to claim 1, wherein, the display area is provided on a head-up display of the host vehicle.

5. A vehicle information display method comprising:
detecting an object in a surrounding area of a host vehicle; and
displaying a display frame corresponded to the object using an electronic control unit,
the display frame being corresponded to the object so as to emphatically display the detected object when detecting the object,
wherein a display area for displaying the display frame in a mode of surrounding the object is displayed, and the display frame is displayed so that an emphasizing degree of an enlarging part of the display frame is less than the emphasizing degree of a non-enlarging part, when the display frame enlarges according to a movement of the object in appearance in the display area as the host vehicle moves.

* * * * *